Dec. 27, 1927.
F. LJUNGSTRÖM
1,654,294
REGENERATIVE AIR OR GAS PREHEATER
Original Filed Aug. 3, 1922   2 Sheets-Sheet 1
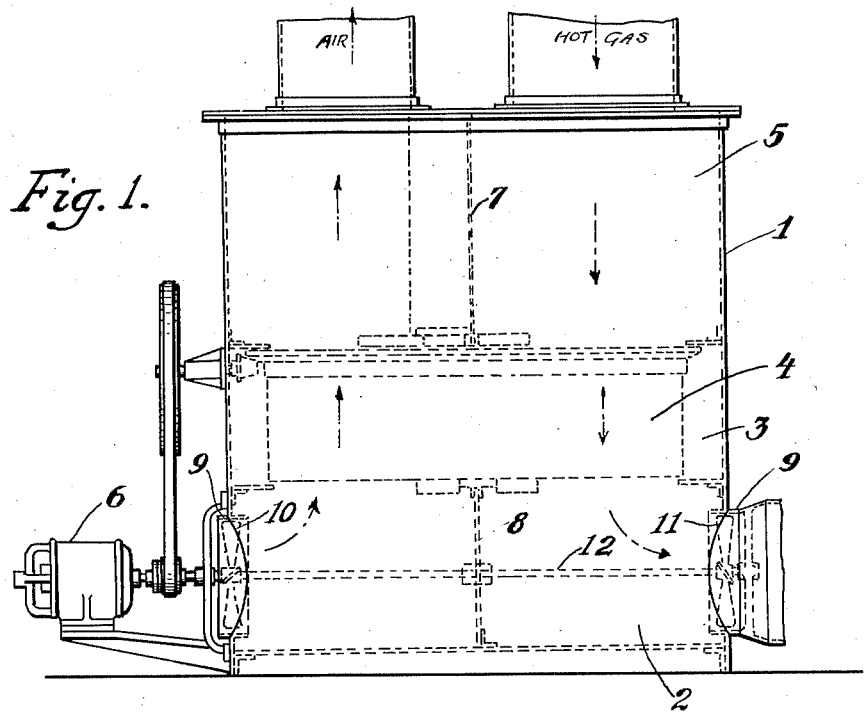
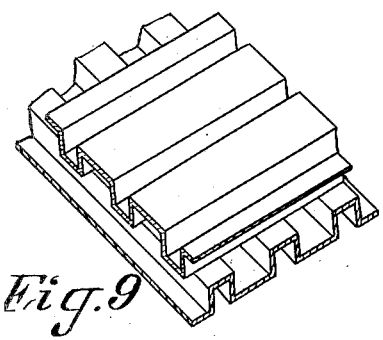
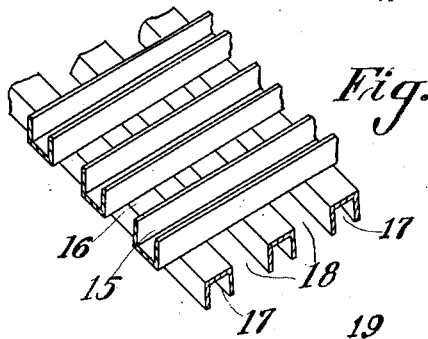
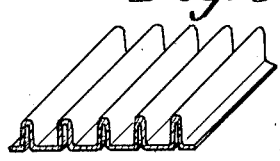
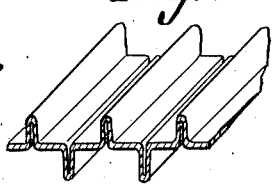
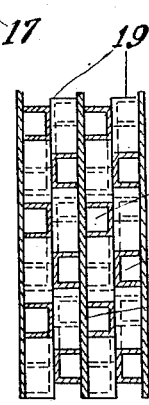
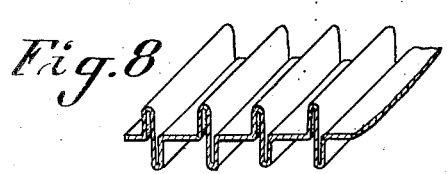
Inventor
Fredrik Ljungström
By Marks & Clerk
Attorney Dec. 27, 1927.  1,654,294
F. LJUNGSTRÖM
REGENERATIVE AIR OR GAS PREHEATER
Original Filed Aug. 3, 1922   2 Sheets-Sheet 2
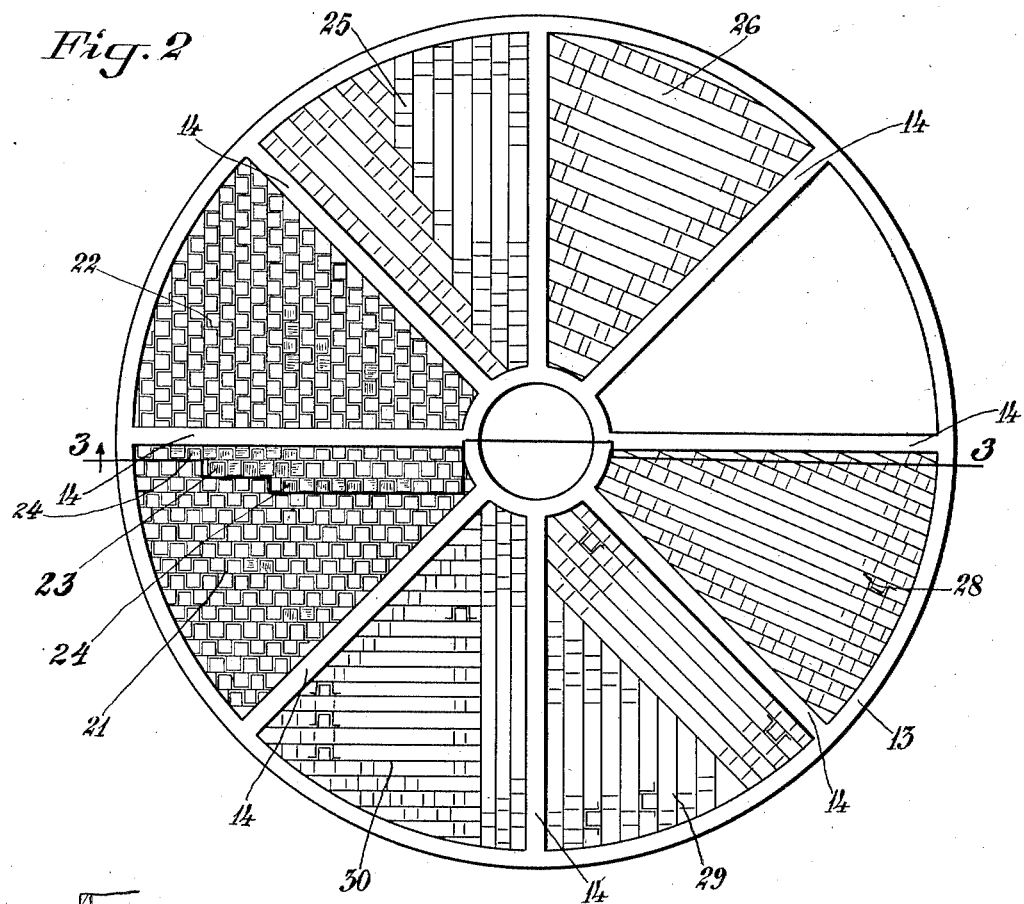
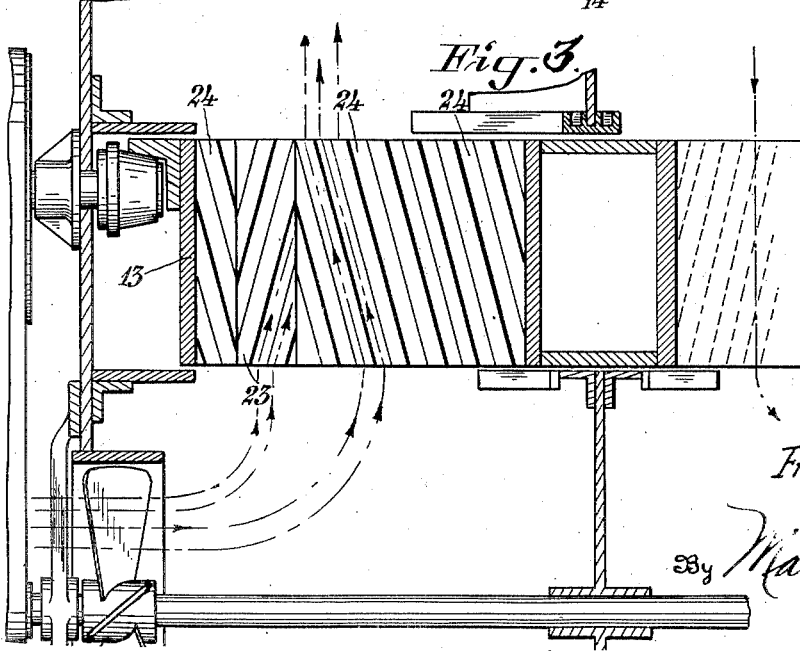
Inventor
Fredrik Ljungström
By Marker Clark
Attorney Patented Dec. 27, 1927.

1,654,294

UNITED STATES PATENT OFFICE.

FREDRIK LJUNGSTRÖM, OF LIDINGO-BREVIK, SWEDEN, ASSIGNOR TO AKTIEBOLAGET LJUNGSTROMS ANGTURBIN, OF STOCKHOLM, SWEDEN, A CORPORATION.

REGENERATIVE AIR OR GAS PREHEATER.

Application filed August 3, 1922, Serial No. 579,545, and in Sweden January 30, 1922. Renewed September 27, 1927.

My invention relates to heat exchange apparatus generally and more particularly to regenerative heat exchange apparatus of the type wherein a rotor containing a regenerative mass is caused to rotate partly in a fluid from which heat is to be extracted and partly in a fluid to be heated, the two fluids both passing through the rotor.

More specifically my invention relates to an air preheater wherein the fluid to be heated is cold air and the fluid from which heat is to be extracted is hot products of combustion.

The purpose of the invention is to provide a regenerative material for use in heaters of the above described type which is particularly effective for heat transfer and causes intimate contact of the fluids therewith.

This regenerative material consists preferably of metal parts such as bars or plates or iron, nickel, copper, brass, or the like, depending on the nature of the fluids between which the transmission of heat is to be effected, these metal parts being arranged so as to form a plurality of passageways extending at angles to each other.

The invention is illustrated in the accompanying drawing wherein:

Fig. 1 is an organization view of a preheater containing a rotor in which the regenerative material of this invention may be used.

Fig. 2 is a top plan view of a rotor containing regenerative material according to the invention and adapted for use in the preheater shown in Fig. 1, a different arrangement of regenerative material being shown in each section of the rotor.

Fig. 3 is a cross-section of the rotor taken on the line 3—3 Fig. 2, together with associated parts.

Figs. 4, 5, 6, 7, 8, and 9 show several embodiments of the regenerative material.

The preheater shown in Fig. 1 comprises a cylindrical housing 1 divided into three major compartments; a lower compartment 2, an intermediate compartment 3 containing a rotor 4 and an upper compartment 5. The rotor 4 is kept in continual rotation by means of the electric motor 6 from which power is transmitted to the rotor through any suitable means.

The upper compartment is divided into two halves by means of a partitioning member 7 and similarly the lower compartment is divided into two halves by partition member 8. By means of these partitioning members the housing is divided into two passageways for the different mediums of heat exchange. In each half of the lower compartment is a fan opening 9. These fan openings contain fans 10 and 11 which are mounted on a common shaft 12 which is also driven by the electric motor 6. Connected to one-half of the upper compartment is an outlet conduit and to the other half an inlet conduit.

As an air preheater the device operates as follows:

Hot products of combustion are drawn in through the preheater by means of the fan 11, passing down through the right hand side of the preheater as shown in Fig. 1, through the rotor, where the heat of the products of combustion is given up to the regenerative mass, and out through the fan 11 as indicated by the arrows. Cold air is drawn in through fan 10 and passes up through the rotor on the left hand side of the preheater as shown in Fig. 1. As this cold air passes through the rotor it abstracts heat therefrom, due to the continual rotation of rotor 4, whereby the regenerative mass is first subjected to the hot products of combustion and moved relatively to the casing to be subjected to the incoming cold air.

The rotor 4 is shown in detail in Figs. 2 and 3. It consists of a cylindrical framework 13 provided with radial walls 14 dividing the framework into sector-shaped compartments, which are filled with regenerative material consisting, according to the invention, of strips or plates placed crosswise and preferably of metal.

As shown in Fig. 4 the material may consist of U or channel bars placed cross-wise, these bars being riveted or welded at all or any of the crossing points, thus forming units consisting of gratings such that the channels 15 within the bars and those 16 between the bars of one row extend cross-wise of the channels 17 of the bars and those 18 between the bars of an adjacent row of bars. From this figure it is also clear, that every other channel of the one row communicates with every other channel of the next row.

If it is desired to avoid such communication between the channels of any of the different units, substantially flat plates may be interposed between them. Such an arrangement is shown in Fig. 5 wherein a portion of a grating is shown consisting of two units 19 each consisting of two rows of U or channel bars according to Fig. 4 separated from each other by intermediate plates 20. Said plates 20 do not reduce to any appreciable extent the surface of the regenerative material.

Figs. 6, 7 and 8 show how a single plate may be bent or corrugated to form flanges or corrugations forming channels between them. If these plates be placed in such manner that the flanges cross one another suitable forms of regenerative material are obtained.

Fig. 9 shows how a single plate can be bent so as to form coherent U or channel shaped strips. These single plates may be united in any manner and connected to the framework of the rotor in any of various well known ways, as for example by welding.

From Figs. 2 and 3 it is clear how such gratings or units of channel bars or plates may be arranged in the rotor in different ways. As shown in the sector-shaped compartment 21 of the rotor every other row of plates is so arranged in the rotor that the channels 23 of one row will be directed from the cylindrical wall 13 towards the rotor axis, whereas every other row will be so arranged that the channels 24 of such row will be directed from the rotor axis towards the cylindrical wall 13, when the rotor is seen from below. In other words in the regenerative material there will be a series of channels crossing each other, said channels forming at the same time an angle to the rotor axis, that is to say to the direction of flow of the fluids before entering the rotor. The fluids will thus have free passage through the channels of the material, the current of fluids being divided into several streams, some of which, namely those which pass through the channels 24, being directed obliquely outwards towards the cylindrical wall 13 of the rotor, whereas the other streams namely those which pass through the channels 23, will be directed obliquely inwards towards the rotor axis. As adjacent channels, oblique to each other, are in communication, there are formed tortuous as well as straight paths through the rotor and the fluids will be caused to whirl so as to bring every particle thereof into contact with the material. In the compartment 21 of the rotor the rows are arranged in parallel with one of the radial walls 14 of the rotor.

It could be imagined that it would be most suitable to place certain strips radially in the rotor, but in such case it would prove difficult to fill the interspaces at the peripheral parts of the material, and in any event it would afford less space for the regenerative material.

In the compartment 22 of the rotor the rows of strips are arranged at right angles to one of the radial walls 14.

In the compartment 25 of the rotor certain rows are parallel to both the adjacent radial walls.

Different manners of placing the units or gratings of which the regenerative material is composed are shown diagrammatically in the remaining portions 26, 28, 29 and 30 of the rotor. In each of the several arrangements shown, however, the channels lie at an angle to the axis of the rotor and are to be considered as being oblique thereto, irrespective of the fact that the axes of the channels may not intersect the rotor axis.

Rows of strips or plates as described above and placed for instance in a rotor according to Figs. 2 and 3 are easily exchangeable if unfit for use. Such exchange is readily performed by removing the elements in a direction parallel to the axis of rotation of the rotor.

It will be obvious that various arrangements of plates or bars and various relations of parts may be employed without departing from the principle of the invention.

This application is to be considered as relating back to my copending application Ser. No. 460,600, filed Apr. 11, 1921, for common subject matter.

What I claim and desire to secure by Letters Patent of the United States is:

1. In a heat exchange apparatus, the combination with a framework, means including inlet and outlet passages for causing a body of heating fluid to flow through said framework, means including inlet and outlet passages for causing a body of fluid to be heated to flow through said framework and means causing relative motion between said passages and framework, of regenerative material comprising metallic members mounted in said framework to form a plurality of channels extending from said inlet to said outlet passages at an angle to the general line of fluid flow through the latter, whereby said fluid bodies are subdivided while passing through said framework into a plurality of small streams moving at an angle to the general line of flow through said passages.

2. In a heat exchange apparatus, the combination with a framework, means including inlet and outlet passages for causing a body of heating fluid to flow through said framework, means including inlet and outlet passages for causing a body of fluid to be heated to flow through said framework, and means causing relative motion between said passages and framework, of regenerative material comprising metallic members mounted in said framework to form a plurality of channels extending in different directions from said inlet to said outlet passages at an angle to the general line of fluid flow through the latter, whereby said fluid bodies are subdivided while passing through said framework into a plurality of small streams moving at an angle to each other and at an angle to the general line of flow through said passages.

3. In a heat exchange apparatus, the combination with a framework, means including inlet and outlet passages for causing a body of heating fluid to flow through said framework, means including inlet and outlet passages for causing a body of fluid to be heated to flow through said framework, and means causing relative motion between said passages and framework, of regenerative material comprising metallic members mounted in said framework to form a plurality of rows of straight channels extending from said inlet to said outlet passages with the channels in some of said rows disposed at an angle to the channels in other rows and with all of said channels disposed at an angle to the general line of flow through said passages.

4. In a heat exchange apparatus, the combination with a framework, means including inlet and outlet passages for causing a body of heating fluid to flow through said framework, means including inlet and outlet passages for causing a body of fluid to be heated to flow through said framework, and means causing relative motion between said passages and framework, of regenerative material comprising a plurality of bent metallic members forming rows of channels disposed between said inlet and outlet passages at an angle to the general line of flow through the latter and flat metallic plates separating some of said rows, whereby communication between some of said rows of channels is prevented.

5. In a heat exchange apparatus, the combination with a framework, means including inlet and outlet passages for causing a body of heating fluid to flow through said framework, means including inlet and outlet passages for causing a body of fluid to be heated to flow through said framework, and means causing relative motion between said passages and framework, of regenerative material comprising metallic members mounted in said framework to form a plurality of rows of straight channels extending from said inlet to said outlet passages, with the channels in some of said rows disposed at an angle to the channels in other rows and communicating therewith to form a plurality of both straight and tortuous paths through said framework.

6. In a heat exchange apparatus, the combination with a framework, means including inlet and outlet passages for causing a body of heating fluid to flow through said framework, means including inlet and outlet passages for causing a body of fluid to be heated to flow through said framework, and means causing relative motion between said passages and framework, of regenerative material comprising crossed metallic members mounted in said framework to form a plurality of straight intercommunicating channels serving to subdivide said fluid bodies and change their direction of flow as they pass through said framework.

7. In a heat exchange apparatus, the combination with a framework, means including inlet and outlet passages for causing a body of heating fluid to flow through said framework, means including inlet and outlet passages for causing a body of fluid to be heated to flow through said framework, and means causing relative motion between said passages and framework, of regenerative material comprising corrugated metallic plates mounted in said framework to form a plurality of channels extending from said inlet to said outlet passages, the corrugations in each plate extending at an angle to the corrugations in adjacent plates.

8. In a heat exchange apparatus, the combination with a framework, means including inlet and outlet passages for causing a body of heating fluid to flow through said framework, means including inlet and outlet passages for causing a body of fluid to be heated to flow through said framework, and means causing relative motion between said passages and framework, of regenerative material comprising a plurality of metallic plates mounted in said framework, each of said plates being bent to form a row of oppositely facing open channels for the passage of said fluid bodies therethrough, and said plates being disposed with the channels in each plate extending at an angle to the channels in adjacent plates.

9. A heat transferring body for use in a regenerative heater comprising a framework subdivided into compartments, and a plurality of rows of spaced U-shaped metal members filling said compartments, and forming channels for the passage of fluid therethrough, with the members in each row extending at an angle to the members in adjacent rows and parallel with the members in alternate rows.

10. A heat transferring body for use in a regenerative heater comprising a framework subdivided into compartments, a plurality of rows of spaced U-shaped metal members filling said compartments and forming channels for the passage of fluid therethrough, the members in adjacent rows extending at an angle to each other with the arms of the members disposed in opposite directions, and flat metal plates located between said rows.

11. A heat transferring body for use in a regenerative heater comprising a framework subdivided into a plurality of compartments having converging side walls, and a plurality of bent metal members forming a plurality of rows of channels of substantially equal area for the passage of fluid therethrough, with adjacent rows of channels lying at an angle to each other and some of said rows lying parallel to one of said side walls.

12. A heat transferring body for use in a regenerative heater comprising a framework subdivided into compartments, and a plurality of bent metal members filling said compartment and forming channels extending in different directions for the passage of fluid therethrough, said members being welded together at a plurality of points of contact to form units including channels extending in different directions, and said units being removably mounted in said compartments.

13. A rotor for use in regenerative heaters comprising a cylindrical wall, an axis, compartments formed between said cylindrical walls and axis, regenerative material in said compartments arranged to form passages for fluid oblique to the axis of the rotor.

14. A rotor for use in regenerative heaters comprising a cylindrical wall, an axis, compartments formed between said cylindrical walls and axis, regenerative material in said compartments comprising rows of plates, said plates being formed to provide channels and adjacent rows being placed so that the channels extend at an angle with each other and at an angle with the axis of rotation of the rotor.

15. An apparatus of the class described comprising a plurality of chambers each having a multiplicity of nested corrugated metal plates therein arranged to form a multitude of passages having a vast surface and automatically controlled means for alternately controlling the passage of gas and air respectively through each of said chambers.

In testimony whereof I affix my signature.

FREDRIK LJUNGSTRÖM.